(12) United States Patent
Jaegtnes et al.

(10) Patent No.: US 6,754,339 B1
(45) Date of Patent: Jun. 22, 2004

(54) MESSAGE TRANSMISSION SYSTEM

(75) Inventors: Ingemar Jaegtnes, Rödeby (SE); Gerhard Zimmermann, Vienna (AT)

(73) Assignee: Ericsson Enterprise GmbH, Vienna (AT)

( * ) Notice: Subject to any disclaimer, the term of this patent is extended or adjusted under 35 U.S.C. 154(b) by 464 days.

(21) Appl. No.: 09/643,683

(22) Filed: Aug. 24, 2000

(30) Foreign Application Priority Data

Sep. 15, 1999  (AU) ............................................. 1585/99

(51) Int. Cl.[7] .......................... H04M 1/00; H04M 1/64; H04M 9/00
(52) U.S. Cl. .............................. 379/399.01; 379/88.12; 379/395.01; 379/396; 379/413
(58) Field of Search .......................... 379/93.35, 93.36, 379/100.08, 100.09, 100.15, 100.17, 93.17, 93.23, 88.12, 88.11, 322, 324, 401, 413, 395.01, 396, 100.05, 399.01

(56) References Cited

U.S. PATENT DOCUMENTS

| | | | |
|---|---|---|---|
| 3,651,270 A | * 3/1972 | Lee et al. | 379/210.02 |
| 5,392,349 A | * 2/1995 | Elder, Jr. | 379/412 |
| 5,521,964 A | * 5/1996 | Schull et al. | 379/88.12 |
| 5,612,995 A | 3/1997 | Corwith | |
| 5,745,563 A | * 4/1998 | Prentice | 379/399.01 |
| 5,768,366 A | * 6/1998 | Jauregui et al. | 379/396 |
| 6,556,663 B2 | * 4/2003 | Danner et al. | 379/67.1 |

FOREIGN PATENT DOCUMENTS

JP          06164772 A       6/1994

* cited by examiner

Primary Examiner—Binh Tieu
Assistant Examiner—Tuan Pham

(57) ABSTRACT

A message transmission system having at least one subscriber's terminal device that is connected by way of a subscriber's line that is comprised of a first and second lead, with a subscriber's interface circuit (SLIC), preferably integrated, which comprises a loop detector circuit and subscriber's feeder circuit, such that in the area of, or on the subscriber's terminal device, a subscriber signaling display is provided, which may be controlled by way of a signaling control circuit, and such that a controllable switch (8) is connected between the subscriber's interface circuit (3) and the first lead (a) of the subscriber's line (a, b), which switch, in a first position, connects the first lead (a) of the subscriber's line (a, b) and an input of the subscriber's interface circuit (3) with each other, and in a second position, connects the first subscriber's line lead (a) with a pole of an additional power source (5). The other pole of the additional power source (5) is connected to a voltage supply pole (19) of the subscriber's interface circuit (3), and the controllable switch (8) may be controlled by way of the signaling control circuit (12).

13 Claims, 1 Drawing Sheet

MESSAGE TRANSMISSION SYSTEM

Figure 1:
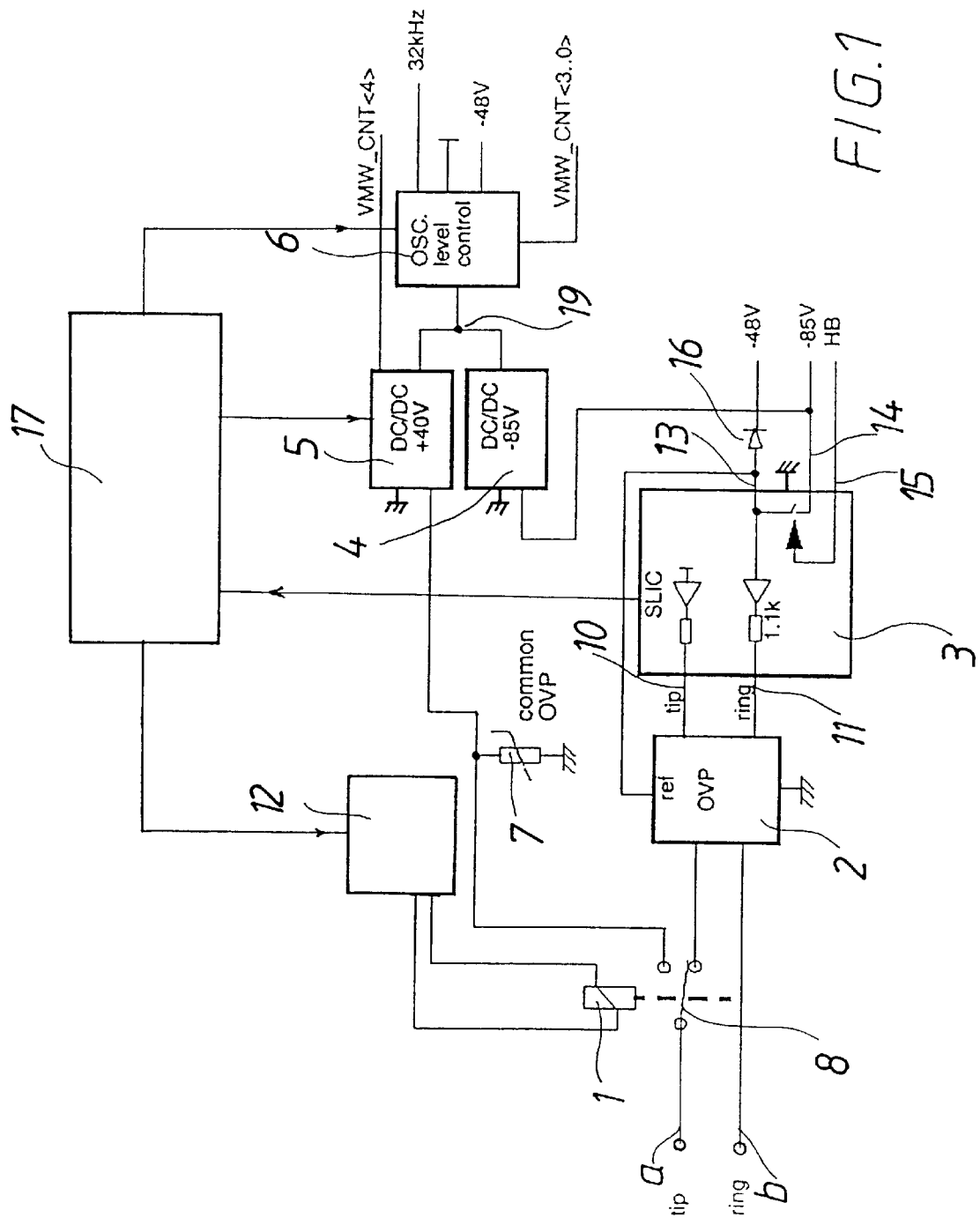

This application claims priority under 35 U.S.C. §§119 and/or 365 to A 1585/99 filed in Austria on Sep. 15. 1999; the entire content of which is hereby incorporated by reference.

The invention pertains to a message transmission system having at least one subscriber's terminal unit, which is connected, via a subscriber's line that is constructed of a first and second lead, to a subscribers' interface circuit (SLIC), preferably integrated, which comprises a loop detector circuit and a subscriber's feeder circuit, such that in the area of the subscriber's terminal device, or on it, a subscriber's signaling display is provided, which may be controlled by means of a signaling control circuit.

Message transmission systems with subscriber signaling displays have been used for some time. In the USA in particular, such subscriber signaling displays are common; with their assistance, a particular condition can be imparted to the subscribers. Thus, the condition "Message waiting" (message ready for retrieval) is displayed by means of low-voltage neon-glow lamps or LEDs that are applied to the subscriber's terminal unit specifically for that purpose, for which function there exists a need, in hotels, for example, to notify the hotel guests of the existence of a message that has been left at the hotel reception desk in their absence. The message left may be a written notice, for example, or an electronic message (voice message). Customarily, the feeder voltage levels on the subscriber's line are 24V, 48V, or 60V. In order to prevent, in a manner that is certain, this subscriber's signaling display from responding at these voltages, the ignition voltage of the low-voltage neon-glow lamps is selected to fall within a range of 90 or 120V, or the LED displays are topped by voltage comparators, which correspond to the LED displays whose threshold limits are adjusted to these higher voltage values. However, these higher voltage levels also presuppose costly discrete SLICs (Subscriber Line Interface Circuits), which have, in contrast to the integrated SLICs, which can be operated with a maximum voltage supply of up to 90V, a correspondingly higher voltage resistance at their disposal, so that they are not destroyed by the relatively high operating voltage of the signaling display lamps. The space needed for this purpose and the expenditure of labor, in terms of circuitry, increase the costs of signaling the subscribers.

It is the task of the invention, therefore, to indicate a circuitry arrangement for a subscriber's signaling device of the sort alluded to at the outset, a device that can be operated with cost-effective circuits, preferably integrated SLIC circuits.

According to the invention, this is accomplished by virtue of the fact that a controllable switch is wired between the subscriber's interface circuit and the first lead of the subscriber's line, a switch which, in a first position, connects the first lead of the subscriber's circuit and an input of the subscriber's interface circuit with each other, and in a second position, connects the first subscriber's line lead with one pole of an additional power source, such that the other pole of additional power source is connected with a feeder voltage input of the subscriber's interface circuit, and such that the switch that can be controlled via the signaling control circuit.

In this way, the loop detector circuit of the subscriber's interface circuit can be used, as it has been thus far, to monitor the loop current that flows in the subscriber's line, such that when the switch that can be controlled is in the reversed state, a subscriber's signaling display is operated, and if a loop current is detected in one subscriber's lead, the deactivation of subscriber's signaling display can be effected. Thus, a separate subscriber's feed circuit is no longer necessary for the subscriber's signaling display, as a result of which the need for space and the requisite financial expenditure, when compared with the customary solutions, can be decreased. Furthermore, the expense incurred for separate protection from over-voltage is also dispensed with in the case of the circuit that has been saved.

A variant of the invention can reside in the fact that the additional power source is comprised of a first power source and a second power source that is connected to it in series, such that one of the poles of the first power source exhibits negative polarity, and one of the poles of the second power source exhibits positive polarity, relative to ground potential, and that the negative pole of the first power source is connected to the feeder voltage input of the subscriber's interface circuit, and the positive pole of the second power source is connected with the first lead of the subscriber's line in the controllable switch's second position, such that the extent of the terminal voltage of the first power source does not exceed the maximum allowable operating voltage of the subscriber's interface circuit.

By these means, the full, maximum voltage can, on the one hand, be applied to the subscriber's interface circuit with the aid of the first power source, and the difference that is needed to achieve low-voltage neon glow lamp ignition can be provided by the positive second power source, such that positive and negative voltage add up to the requisite ignition voltage.

According to another advantageous embodiment of the invention, the terminal voltage of the first power source can be −85V and the terminal voltage of the second power source can be +40V. Thus, on the one hand, by way of the first power source alone, it is possible to operate a low-voltage neon-glow lamp having a usual ignition voltage of ca. 90V, and, by adding the second power source by means of a controllable switch, it is possible to operate a low-voltage neon-glow lamp having an ignition voltage of ca. 120V.

To safeguard the inputs of the integrated subscriber's interface circuit against voltage overloads, it is possible, in a manner that is known, per se, to top the latter with an overload circuit, which prevents the destruction of the subscriber's interface circuit in the event of a voltage overload.

A re-arrangement of the circuitry that can be undertaken in a manner that is safe and sparing in its consumption can be achieved according to an extension of the invention by virtue of the fact that the controllable switch is formed by means of a switching contact of a bistable relay.

Provision can be made, furthermore, for comprising the lead out of the lead to ground because in many instances, two feeder inputs are provided for the other, voltage-bearing lead of the subscriber's line so that the provision of a higher voltage for the purpose of operating the subscriber's signaling display can be undertaken, in part, in a very simple manner through the use of these feeder inputs.

According to another embodiment form of the invention, provision can be made so that the circuit with loop detection function that is provided in the subscriber line interface circuit (SLIC), exhibits at least one input for the purpose of detecting the loop current that flows in the first or second lead of the subscriber's line. In this way, a loop current can be detected even if it flows by way of just one input of the subscriber's interface circuit. Such an operational case is present if the controllable switch is switched to its second position and thus, the current flow is diverted by way of the additional voltage source. The detection of a loop current is possible, therefore, due to the particular configuration of the subscriber interface circuit, even though the latter flows only into one input of the subscriber's interface circuit.

For the sake of producing the operational voltage that is necessary to operate the subscriber's signaling display in a manner that keeps power losses as low as possible, the former can be comprised of a direct current transformer.

Furthermore, according to an additional embodiment of the invention, the direct current transformer can be capable of being controlled in its output voltage, such that one transitional function, preferably in the form of a ramp, between a minimal and maximal value, can be set. With the aid of the transitional function, it is possible to avoid the short-term response, due to a rapid voltage spike, of a ringer assembly that is located within the subscriber's device. A transition between the turned on and the turned off state that is as continual as possible thus prevents an activation of the ringer assembly.

Furthermore, the invention pertains to a process for controlling a subscriber's signaling display through the use of a transmission system according to the invention.

The task is to render a switching off of the subscribers signaling display possible with the aid of the subscriber's interface circuitry, which is provided for the purposes of telephony, in order to save the costs and the space required for an additional subscriber's feed circuit, including the detectors.

According to the invention, provision is now made so that one pole of the additional power source is connected to the first lead of the participant's line for the purpose of activating the subscriber's signaling display and so that the subscriber's interface circuit monitors the loop current that flows in the second lead of the subscriber's line, and the subscriber's signaling display is deactivated when a predetermined threshold value is exceeded.

In this way, the subscriber's interface circuit can, on the one hand, perform its functions with respect to feeding, signaling calls and monitoring loop current for the subscriber's terminal device, and, on the other hand, also provide the signals for the termination of the subscriber's signaling display as soon as a loop current is detected.

In an additional embodiment of the invention, provision can be made so that the activation and the deactivation of the subscriber's signaling display is undertaken with a transitional function. The transitional function has, as a consequence, a relatively slow increase in the operational voltage that is necessary for signaling.

For digital controls, it can be advantageous, furthermore, if, by way of extension of the invention, the transitional function is comprised of a ramp-like increase or diminution of the voltage, respectively. In this way, a digital value can be assigned to every voltage step, as a result of which, a programmable control can be undertaken by simple means, whereby, in addition, the transitional function can be embodied, preferably of eight individual voltage steps.

According to a further variant of the invention, provision can be made so that for signaling a call, the controllable switch is placed into the first position, and if a subscriber signaling display is present during pauses in calling, it is placed into the second position.

In what follows, the invention is elucidated in detail by virtue of the embodiment example that is represented in the drawing.

FIG. 1 shows a partial block circuit diagram of an embodiment form of the message transmission system according to the invention.

FIG. 1 shows parts of a message transmission system, in particular, of a telephone system, with a subscriber's line comprised of a first and a second lead a, b that leads to a subscriber's terminal device, which is not depicted, which is connected by way of the subscriber's line a, b to a subscriber line interface circuit (SLIC) 3, which is preferably integrated. As a matter of principle, within the context of the invention, a subscriber's interface circuit can also be provided for several subscribers' terminal devices.

The subscribers' interface circuit 3 is part of an extension system, of an automatic exchange, or the like; it performs various functions for the transmission of messages and in addition to other circuits, it comprises a subscribers' feeder circuit and a loop detector circuit, which detects loop currents that occur in the subscriber's line, a, b and is designed to ascertain these loop currents, which occur when the receiver of the subscriber's terminal device is lifted, and, when a certain current threshold is exceeded, to give a signal to a central control device 17, which is connected to the subscriber's interface circuit 3, with the help of which signal, a call signal which is fed to subscriber's line a, b is terminated.

In the area of, or on the subscriber's terminal device, an optical or acoustical subscriber signaling display, which is not depicted either, such as, for example, a low-voltage neon-glow lamp, is provided, which may be controlled by way of a signal control circuit, 12, of the subscriber's interface circuit. In this way, the subscriber can receive an indication from the extension system or the automatic exchange of various conditions, such as "message waiting." Low-voltage neon-glow lamps having an ignition voltage of ca. 90V or ca. 120V are used for such subscriber signaling displays. However, an LED that is topped by a voltage comparator that activates the latter when the voltage threshold of 90V or 1 20V is exceeded may also be used as an optical subscriber's signaling display.

Thus far, a distinct interface circuit has been necessary for a subscriber's signaling display due to the fact that an integrated subscriber's interface circuit of the usual type is not sufficiently robust to withstand the voltage to operate a signaling display having an ignition voltage of 120V.

According to the invention, provision is made so that a controllable switch 8 is wired between the subscriber's interface circuit 3 and the first lead a of the subscriber's line, which switch, as is shown in FIG. 1, connects, in a first position, the first lead a of the subscriber's line and a first input 10 of the subscriber's interface circuit 3 with one another, and, in a second position, [connects] the first subscriber's lead a with a pole of an additional power source 4, 5, which is comprised, in the embodiment example depicted, of a first power source and a second power source that is connected to the latter. The other pole of the additional power source 4, 5 is connected to a power feed input 14 of the subscriber's interface circuit 3. Thus, in the second switch position of the controllable switch 8, the sum of the voltages of the first and the second power source 4, 5 is present at the first lead a of the subscriber's line, as opposed to the feed input 14 of the subscriber's interface circuit 3, as a result of which the subscriber's signaling display receives sufficient voltage and the display is activated.

One of the poles of the first power source 4 exhibits negative polarity, and one of the poles of the second power source 5 exhibits positive polarity relative to the ground potential, whereby the negative pole of the first power source 4 is connected to the power feed input 14 and the positive pole of the second power source 5 is connected in the second position of the controllable switch 8 to the first lead a of subscriber's line. The extent of the terminal voltage of the first power source 4 is selected in such a way that it does not exceed the maximum allowable operating voltage of the subscriber's interface circuit 3.

The terminal voltage of the first power source 4, in the embodiment example according to FIG. 1, is −85V, and the terminal voltage of the second power source 5 is +40V. Thus, on the one hand, 85V are available for a low-voltage neon-glow lamp having an ignition voltage of ca. 90V, and, on the other hand, in the second position of switch 8, 125V are available for a low-voltage neon-glow lamp having an ignition voltage of ca. 120V. Both instances can thus be realized with the circuitry arrangement according to the invention.

The switch 8, which can be controlled between the first and second switch position, may be controlled by way of signaling control circuit 12, which obtains its information from the central control device 17. This central control device 17 causes the activation and deactivation of the subscriber's signaling display as soon as a corresponding command is extant for a message to be signaled to the subscriber's terminal device. It exhibits, in addition, an input that is connected to the subscriber's interface circuit, which is connected to the output of the loop detector circuit. As soon as a loop current that exceeds the prescribed threshold is detected in the latter, the central control 17 causes the deactivation of the subscriber's signal display. The subscriber's interface circuit 3 is directly topped by an over-voltage circuit 2 which protects the sensitive inputs 10, 11 of the subscriber's interface circuit 3 from any excessive voltages that might occasionally occur.

The controllable switch is comprised, preferably of the switch contacts 8 of a bistable relay 1, which exhibits the advantages of a low power consumption and a high voltage resistance. In the contact state that is being addressed, a bistable relay draws essentially no current. All other types of controllable switches may be used, however, most have either a high power consumption or a resistance to voltage that is too low.

In the embodiment example according to FIG. 1, the first lead a, which is connected to one input 10 of the subscriber's interface circuit 3 by means of controllable switch 8 via over-voltage circuit 2, is formed by means of the lead (tip) that is related to the ground. As a matter of principle, however, the lead b (ring), which conducts the voltage, can be disrupted by the controllable switch.

The use of the first lead a is thus particularly advantageous because the lead b of the SLIC 3, which conducts the voltage, is connected to two feeder inputs 13, 14 which are connected to two distinct voltages, −48V, and to the first power source 4, −85V, such that the latter power source serves to supply the subscriber's signaling display and the call signal, which can be operated either with −85V, or in the second switching position, by availing itself of the second power source 5 with −125V. Both the first as well as the second power source 4, 5 can be comprised of a DC/DC converter.

In the first switch position of the controllable switch 8, when the subscriber's loop is closed in the first as well as in the second subscriber's lead, a loop current flows by way of inputs 10, 11 into the loop detector circuit 3 such that the currents that flow into both inputs 10, 11 are added and compared with a threshold value that can be adjusted.

If the controllable switch 8 is in the second switch position, the subscriber's signaling display is activated. A loop current flows only into the input 11 of the SLIC 3, whereas input 10 remains devoid of current. The loop detector circuit exhibits, to this end, at least one input for the purpose of detecting the loop current that flows within the first or second lead a, b of the subscriber's line. Thus, in addition, the current that flows in just one subscriber's line lead, in FIG. 1, lead b can be detected. Due to the internal wiring of the loop detector circuit, the threshold current for one input 11, is, in the second switch position, twice as great as the threshold current for the loop current that flows into both inputs 10, 11 in the first switch position.

If the subscriber's signaling display according to FIG. 1 is activated via the controllable switch 8, that is, switch 8 is switched to the second position, the loop current flows only by way of the second input 11 of the SLIC 3, such that a threshold current that is, in comparison with the nominal threshold current, 8 mA, for example, twice as great, 16 mA, for example, must be exceeded. If the receiver of a subscriber's terminal device is lifted when subscriber signaling is present, the loop current exceeds the threshold of 16 mA. As a consequence of that, a de-activation of the subscriber signaling is undertaken by the central control device 17.

If a bipolar, bistable relay is used, the additional pole can be used for adjusting the threshold value of the input current for the SLIC 3 for subscriber signaling. This is not absolutely necessary, however, due to the fact that this value may also be determined by means of a control input of the SLIC 3.

As a result of the collateral use of the SLIC 3 for the subscriber's signaling display, not only can a distinct subscriber's feeder circuit, but also an additional over-voltage circuit can be saved, so that reduced costs and expenditures of space can be achieved. In FIG. 1, merely a common over-voltage structural component 7, for example, a low-cost varistor, is provided for the supplemental power source 5.

The first power source 4 is comprised, in FIG. 1, of a direct current transformer, which is controlled by an oscillator 6, with a frequency of, for example, 32 kHz, which is recovered from a DP-PLL circuit. The generator's frequency and shape of curve exert no influence upon the invention and they can be varied at will. In the process, the direct current transformer 4 produces the voltage −85V out of the available battery voltage −48V, which, however, in the context of the invention, can be made available in another way and which is found at feeder input 14 of the subscriber's interface circuit 3. The battery voltage, −48V, is found, by way of a diode 16, at an additional feeder input 13, such that the lead b (ring), which conducts the current, may be switched by means of a control input 15 between this voltage and the −85V. The voltage values that are indicated may be freely selected within certain limits, and are not subject to any limitation within the context of the invention.

The output voltage of the second power source 5, +40V, is produced in another direct current transformer by pulsing, via impulse input 19 of the oscillator 6. The extent of the output voltage is attuned in such a way that, in toto, with the −85V at input 14, it yields a voltage value that corresponds to that of operational voltage of the subscriber's signaling display. Accordingly, the output voltage of the additional power source will always have to be adjusted to the requirements of the subscriber's signaling display.

The following conditions yield the following voltage values for the embodiment example according to FIG. 1 in both switch positions.

| First Switch Position: | |
| --- | --- |
| At rest/pauses in calling | −43 V |
| Call | −85 V |
| Loop | −43 V |
| Subscriber's signal display 90 V at rest or during pauses in calling | −85 V |
| Second Switch Position (Subscriber's signaling display | |
| Subscriber's signal display 120 V at rest or during pauses in calling | 40 V + abs (−85 V) = 125 V |

The direct current transformer 5 may be controlled in its output voltage such that a transitional function, preferably one in the form of a ramp, may be adjusted between a minimal and a maximal value of the output voltage. The activation and deactivation of the subscriber's signaling display is undertaken, accordingly, with the aid of a transitional function. In this way, the response of the subscriber's terminal device's ringer assembly, which would otherwise be audible, briefly, in the case of rapid voltage spikes of 85V or 125V on the subscriber's line, can be avoided. The transformational function is comprised of a ramp-like increase or diminution, respectively, of the voltage, which is comprised preferably of eight individual steps.

The direct current voltage transformers 4 and 5 are controlled by four port signals, of which three signals are used for the purpose of adjusting the level of the 32 kHz signal with which the direct current transformer 5 is operated and its output voltage is controlled. This renders a relatively gentle course of the operating voltage that is fed into the subscriber's signaling display possible. The fourth signal of the four port signals that are used serves to start and stop the DC/DC converters. Due to the relatively slow increase of operating voltage for the subscriber's signaling display, which should occur, for example, over a minimum of 300 ms, the activation of the ringer assembly can be prevented.

In the no-load position of the direct current transformer 5, that is, when no subscriber signaling display is to occur, a re-positioning of the controllable switch 8 is effected, so that both leads a, b are connected to the SLIC 3 by way of the over-voltage circuit 2.

The subscriber's interface circuit 3 is used, according to the invention, for the purpose of undertaking the control of the subscriber's signal display, such that the subscriber's interface circuit 3 monitors the loop current in the subscriber's line a, b and the subscriber's signaling display is deactivated when a pre-determined threshold value is exceeded.

If a subscriber's signaling display exists, and the receiver of the subscriber's terminal device is lifted, the loop current increases to a relatively high value, which is recognized by the loop detector in the SLIC 3. As a consequence of that, the controllable switch 8 is repositioned to its first position and the connection of lead a with the direct current transformer 5 is disrupted, which results in a termination of the subscriber's signaling display.

While a calling signal is executed, the subscriber's signaling display can be illuminated only in the calling pauses, because the total power output must be available for the production of the call. In this instance, the −85V are made available solely for the calling signal of the subscriber interface circuit 3 (balanced ringing).

The subscriber's signaling display occurs, however, in the calling pauses, so that the signaling display is illuminated every 300 ms-6 s at least, for example. To this end, controllable switch 8 is moved to the second position during calling pauses.

If several subscribers' devices are operated via a subscriber interface circuit, a corresponding synchronization of the call signal or the subscriber's signaling display is necessary for all subscribers' terminal devices within a group of subscribers, so that the signaling display can continue to become illuminated in the pauses between calling.

What is claimed is:

1. A message transmission system having at least one subscriber's terminal unit, which is connected by way of a subscriber's line that is comprised of a first and second lead, with a subscriber's interface circuit (SLIC), preferably integrated, which comprises a loop detector circuit and subscriber's feeder circuit, such that in the area of, or on the subscriber's terminal device, a subscriber signaling display is provided, which may be controlled by way of a signaling control circuit, comprising:

a controllable switch connected between the subscriber's interface circuit and the first lead of the subscriber's line which switch, in a first position, connects the first lead of the subscriber's line and an input of the subscriber's interface circuit with each other, and in a second position, connects the first lead of the subscriber's line with a pole of an additional power source, such that another pole of the additional power source is connected to a voltage supply input of the subscriber's interface circuit, and the controllable switch may be controlled by way of the signaling control circuit, wherein the additional power source is comprised of a first power source and a second power source, which is connected to the latter in series, such that one of the poles of the first power source, exhibits negative polarity and one of the poles of the second power source exhibits positive polarity, relative to ground potential, and that the negative pole of the first power source is connected to the feeder voltage input of the subscriber's interface circuit and in the second position of the controllable switch, the positive pole of the second power source is connected to the first lead of the subscriber's line, such that the extent of the terminal voltage of the first power source does not exceed the maximum allowable operating voltage of a subscriber's interface circuit.

2. The transmission system according to claim 1, wherein the terminal voltage of the first power source is −85V and the terminal voltage of the second power source is +40V.

3. The transmission system according to claim 1 wherein the inputs of the subscriber's interface circuit are topped, in a manner that is known per se, by an over-voltage circuit.

4. The transmission system according to claim 1, wherein the controllable switch is formed by means of a switching contact of a bi-stable relay.

5. The transmission system according to claim 1, wherein the first lead is formed by the lead that relates to the ground.

6. The transmission system according to claim 6, wherein fact the loop detector circuit exhibits at least one input for the purpose of detecting the loop current that flows in the first or second lead of the subscriber's line.

7. The transmission system according to claim 1, wherein the first and the second power sources are, in each case, comprised of a direct current transformer.

8. The transmission system according to claim 7, wherein the direct current transformer can be controlled in its output voltage, such that a transitional function, preferably a ramp-like function, may be set between a minimum and a maximum value of the output voltage.

9. A process for controlling a subscriber's signaling display through the use of a transmission system having at least one subscriber's terminal unit, which is connected by way of a subscribers line that is comprised of a first and second lead, with a subscriber's interface circuit (SLIC), which comprises a loop detector circuit and subscriber's feeder circuit, such that in the area of, or on the subscriber's terminal device, a subscriber signaling display is provided, which may be controlled by way of a signaling control circuit, comprising a controllable switch connected between the subscriber's interface circuit and the first lead of the subscriber's line which switch, in a first position, connects the first lead of the subscriber's line and an input of the subscriber's interface circuit with each other, and in a second position, connects the first lead of the subscribers line with a pole of an additional power source, such that another pole of the additional power source is connected to a voltage supply input of the subscriber's interface circuit, and the controllable switch may be controlled by way of the signaling control circuit wherein for the purpose of activating the subscriber's signaling display, a pole of the additional power source is connected to the first lead of the subscriber's line;

the subscriber's interface circuit monitors the loop current that flows in the second lead of the subscriber's line, and the subscriber's signaling display is deactivated when a predetermined threshold value is exceeded.

10. The process according to claim 9, wherein the activation and deactivation of the subscriber's signaling display is undertaken by a transitional function.

11. The process according to claim 10, wherein the transitional function is comprised of a ramps like increase or decrease of the voltage respectively.

12. The process according to claim 11, wherein the transitional function is comprised of eight distinct voltage steps.

13. The process according to claim 9, wherein for signaling a call, the controllable switch is switched into the first position and when a subscribers signaling display is present during pauses in calling, switching into the second position occurs.

* * * * *